UNITED STATES PATENT OFFICE 2,344,491

ESTERS OF 4-TERTIARYBUTYL-PHENOXY-ALKYLOLS

Edgar C. Britton and Gerald H. Coleman, Midland, Mich., assignors to The Dow Chemical Company, Midland, Mich., a corporation of Michigan No Drawing. Application June 12, 1941,
Serial No. 397,742

5 Claims. (Cl. 260—488)

The present invention is directed to esters of 4-tertiarybutyl-phenoxy-alkylols and is particularly concerned with compounds having the structural formula:

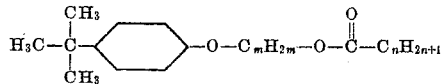

wherein $m$ is an integer from 2 to 4, inclusive, and $n$ is an integer not greater than 3. We have prepared and identified representative members of this group of compounds and found them valuable in the modification of plastic compositions, as vehicles for solvent type printing ink, and as toxicants and repellents in parasiticidal compositions. These esters are relatively non-volatile, water-white liquids difficultly solluble in water and compatible with many common organic solvents.

The new compounds may be prepared by reacting a 4-tertiarybutyl-phenoxy-alkylol with acetic, propionic, or butyric acid in the presence of a suitable esterification catalyst, such as benzene-sulfonic acid. The preferred reaction temperature is from about 75° C. to the decomposition temperature of the reaction mixture. While not essential, the reaction is generally carried out in the presence of a solvent, such as benzene, toluene, etc., and conveniently at the boiling temperature of the reaction mixture and under partial reflux. The solvent aids in removing water of reaction from the mixture, whereby high yields of ester are obtainable. Equimolecular proportions of the reactants give the ester compound in good yield although a slight excess of the acid is preferred. When the reaction is substantially completed, the mixture is cooled, washed to remove catalyst, dried, and fractionally distilled to obtain the desired ester compound in substantially pure form.

Example 1

19.3 pounds of a mixture of beta-(4-tertiarybutyl-phenoxy)-ethanol and 4-tertiarybutyl-phenoxy-propanol were mixed with 9.0 pounds of glacial acetic acid, 150 grams of benzene-sulfonic acid and 0.75 gallon of benzene. The tertiary-butyl-phenoxy-alkylol fraction was composed of 80 per cent by weight of the beta-(4-tertiary-butyl-phenoxy)-ethanol and 20 per cent by weight of a mixed propanol homologue consisting chiefly of beta-(4-tertiarybutyl-phenoxy)-propanol along with a small amount of beta-(4-tertiarybutyl-phenoxy)-alpha-methyl-ethanol.

The mixture was heated for 8 hours to its boiling temperature and under partial reflux, the temperature gradually increasing from 86° to 105° C. A portion of the benzene was steam distilled from the reaction zone along with the water of reaction. The reaction mixture was then cooled to room temperature and washed successively with aqueous sodium bicarbonate solution and water, and thereafter heated to distill off the benzene. The 25 pounds of crude product obtained as a residue were fractionally distilled under reduced pressure to separate 21.3 pounds of a mixture of beta-(4-tertiarybutyl-phenoxy)-ethyl acetate and 4-tertiarybutyl-phenoxy-propyl acetate as a water-white liquid boiling at 115°–117° C. at 1 mm. pressure and having a specific gravity of 1.024 at 25°/25° C.

Example 2

In a similar manner 970 grams (5.0 mols) of beta-(4-tertiarybutyl-phenoxy)-ethanol, 385 grams (5.2 mols) of propionic acid, and 5 grams of benzene-sulfonic acid were reacted together in benzene at temperatures ranging between 86° and 103° C. over a period of 3 hours. The neutralized and washed product was fractionally distilled to obtain 1170 grams of beta-(4-tertiarybutyl-phenoxy)-ethyl propionate as a water-white liquid boiling at 135°–140° C. at 1 mm. pressure and having a specific gravity of 1.014 at 25°/25° C. This compound was insoluble in water and readily soluble in petroleum distillate and 95 per cent ethanol.

Example 3

970 grams (5.0 mols) of beta-(4-tertiarybutyl-phenoxy)-ethanol, 463 grams (5.25 mols) of butyric acid, and 5 grams of benzene-sulfonic acid were reacted together substantially as described in Example 1 over a period of 2½ hours and at a temperature gradually increasing from 91° to 102° C. The crude reaction product was washed with sodium bicarbonate solution and water and fractionally distilled to obtain 1245 grams of beta-(4-tertiarybutyl-phenoxy)-ethyl butyrate as a water-white liquid boiling at 130°–135° C. at 1 mm. pressure and having a specific gravity of 1.001 at 25°/25° C. This compound was substantially insoluble in water and soluble in petroleum distillate and 95 per cent ethanol.

Example 4

In a similar manner 970 grams (5.0 mols) of beta - (4 - tertiarybutyl - phenoxy) - ethanol and 463 grams (5.25 mols) of isobutyric acid were reacted together in the presence of 5 grams of benzene-sulfonic acid and benzene. The reaction temperature gradually increased from 86° to 103° C. over a period of 5½ hours, at the end of which time the crude product was successively washed with aqueous sodium bicarbonate and water. The resultant benzene solution was fractionally distilled to obtain 1236 grams of beta-(4-tertiarybutyl-phenoxy)-ethyl isobutyrate as a water-white liquid boiling at 120°–125° C. at 1 mm. pressure and having a specific gravity of 0.996 at 25°/25° C. This compound was substantially insoluble in water and soluble in petroleum distillate and 95 per cent ethanol.

In place of the beta - (4 - tertiarybutyl - phenoxy)-alkylols shown in the preceding examples other compounds such as beta - (4 - tertiarybutyl - phenoxy) - propanol, gamma - (4 - tertiarybutyl-phenoxy)-propanol, beta - (4 - tertiarybutyl - phenoxy) - butanol, and delta-(4-tertiarybutyl-phenoxy)-butanol may be employed.

We claim:

1. An ester of a 4-tertiarybutyl-phenoxy-alkylol having the formula:

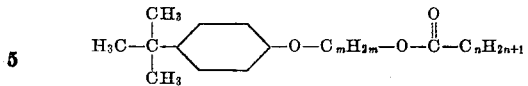

wherein $m$ is an integer from 2 to 4, inclusive, and $n$ is an integer not greater than 3.

2. An ester of beta - (4 - tertiarybutyl - phenoxy)-ethanol having the formula:

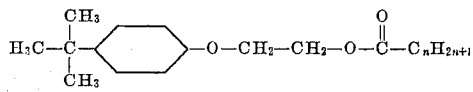

wherein $n$ is an integer not greater than 3.

3. Beta - (4 - tertiarybutyl - phenoxy) - ethyl acetate.

4. Beta - (4 - tertiarybutyl - phenoxy) - ethyl propionate.

5. Beta - (4 - tertiarybutyl - phenoxy) - ethyl butyrate.

EDGAR C. BRITTON.
GERALD H. COLEMAN.